UNITED STATES PATENT OFFICE.

EDWARD HUBBARD RUSSELL, OF NEW HAVEN, CONNECTICUT, ASSIGNOR TO THE RUSSELL PROCESS COMPANY, OF SAME PLACE.

PROCESS OF LEACHING ORES WITH HYPOSULPHITE SOLUTIONS.

SPECIFICATION forming part of Letters Patent No. 403,616, dated May 21, 1889.

Application filed March 3, 1888. Renewed April 17, 1889. Serial No. 307,633. (No specimens.)

*To all whom it may concern:*

Be it known that I, EDWARD HUBBARD RUSSELL, of New Haven, in the county of New Haven, and in the State of Connecticut, have invented certain new and useful Improvements in the Process of Leaching Ores with Hyposulphite Solutions; and I do hereby declare that the following is a full, clear, and exact description thereof.

The object of my invention, as described and claimed in this application, is to provide an improved process of treating ores and metallurgical products, whereby the precious metals can be extracted from the ore or product with only a very small portion of base metal and can be obtained pure with great economy in the consumption of precipitant for such base metal.

With this object in view my invention consists in the process and sub-process or method as hereinafter specified.

The essential idea of my process is to decrease the power of leaching solutions to dissolve lead and lead compounds without diminishing their power to extract the precious metals. This end I accomplish by adding to or introducing into the leaching solution in any desired way a compound or substance which decreases the action of the solution upon lead or its compounds. The compound or substance which I use for this purpose is a sulphate which is not precipitated with the metals contained in the leaching solution after the latter has been used until most of those metals are precipitated.

I have found that such a sulphate as sulphate of lime or calcium when added to or introduced into a hyposulphite solution up to or nearly to the point of saturation decreases the solving action of that solution on lead and lead compounds fully one-half, while at the same time the solving action of the solution on the precious metals or their compounds is not diminished. The sulphate, in other words, diminishes by one-half the power of the leaching solution to dissolve the lead or lead compounds in the ore or metallurgical product, while it does not interfere with the extraction of the precious metal by the solution. As there is such a great reduction in the amount of lead taken into the solution when the sulphate of lime is used, the precious metals can be obtained from the solution with only a small per cent. of lead; or, if it be desired to obtain them entirely free from such base metal, only a small amount of lead precipitant—such, for instance, as a soluble carbonate—is necessary to be used on the solution before the precipitation of the precious metals. The reduction in the amount of lead taken into the leaching solution effects also, necessarily, a great saving in the amount of sodium or other sulphide requisite to precipitate the metals from the solution.

Where the amount of lead taken into the solution is not reduced by the sulphate of lime, as described by me, or removed by a soluble carbonate, a large amount of the precipitating sulphide must be used to get the metals out of the solution. By my process, then, as set forth in this application, I effect a great saving in the amount of lead precipitant necessary to be used where it is desired to precipitate the lead by itself, and also in the precipitants necessary to obtain the precious metals from the solution.

Where a precipitant for the lead by itself is desired, I prefer to use a soluble carbonate—such, for instance, as any one of the compounds included under the head of "carbonate of soda."

When the usual precipitant for the precious metals—sodium or calcium sulphide—is used on the solution, the lime or calcium is not precipitated along with the precious metals if the precipitation of the latter be not made too complete, but remains in the solution. It does not then contaminate the precious metals, and as it is not used up there can be but little expense required to keep the desired amount of the sulphate in the solution.

I intend, particularly, to use the sulphate, as described, with a hyposulphite solution containing sodium, potassium, calcium, magnesium, cuprous, or other hyposulphite.

The sulphate can be added directly to the leaching solution or solutions before use of the same, or it can be introduced into the solution in any desired way—as, for instance, by placing it in or on the ore, so that it will be taken up by the solution as the latter is being used. As employed with the solution, it can be either in the form of native sulphate of lime, as it occurs in nature, or in the artificial form; or it may be introduced in the shape of some compound of lime or other elements adapted to be subsequently converted into sulphate by means of chemical action.

I do not limit myself to the use in my process of any particular form of sulphate of lime or calcium.

As is well known, there are several forms of sulphate included under the name sulphate of lime or calcium, some having several molecules of water and others not. I contemplate using any of these different forms of the compound, as desired, and consider the employment of any or all of them in the manner set forth by me hereinbefore as fully within the scope of my invention, as set forth and claimed in this application.

My invention, as covered in this application, can be applied successfully in the treatment of raw or roasted ores, metallurgical products, or tailings, or to those ores or tailings which have been subjected to the action of chlorine gas.

Having thus described my invention, what I claim is—

1. As an improvement in the art of extracting metals from ores and metallurgical products by means of a leaching solution, the method of diminishing the power of the solution to dissolve lead and its compounds, which consists in introducing into the solution sulphate of lime, substantially as described.

2. As an improvement in the art of extracting metals from ores and metallurgical products, the method of extracting the metals, which consists in treating the ore or product with a hyposulphite solution containing a sulphate of lime or calcium, substantially as and for the purpose described.

3. The process of obtaining metals from ores and metallurgical products, which consists in treating the ore or product with a leaching solution into which sulphate of lime has been introduced, and separating or precipitating the metals from the solution, substantially as and for the purpose described.

4. The process of obtaining metals from ores and metallurgical products, which consists in treating the ore or product with a hyposulphite leaching solution into which sulphate of lime has been introduced, and afterward separating the metals from the solution, substantially as and for the purpose described.

5. The process of obtaining metals from ores and metallurgical products, which consists in introducing sulphate of lime into a hyposulphite solution, treating the ore or product with the resultant solution, and then precipitating the lead from the solution, so as to leave the precious metals, substantially as and for the purpose described.

6. The process of obtaining metals from ores and metallurgical products, which consists in introducing sulphate of lime into a hyposulphite solution and using the resultant solution on the ore or product, then precipitating the lead by means of a carbonate, and finally precipitating the precious metals by means of a sulphide or sulphides, substantially as described.

In testimony that I claim the forgoing I have hereunto set my hand this 21st day of February, A. D. 1888.

EDWARD HUBBARD RUSSELL.

Witnesses:
GEO. H. LARNED,
TALCOTT H. RUSSELL.